United States Patent [19]

Nishi et al.

[11] 3,813,806

[45] June 4, 1974

[54] AUTOMATIC FISHING DEVICE

[75] Inventors: Koji Nishi, Chiryu; Itsuo Kumakura, Takahama; Ukio Hamaguchi, Shima, all of Japan

[73] Assignees: Aishin Seiki Co., Ltd., Kariya City; Hamaguchi Indicator Industry Co., Ltd., Mie Prefecture, both of Japan

[22] Filed: Oct. 12, 1972

[21] Appl. No.: 296,957

[30] Foreign Application Priority Data
Oct. 16, 1971 Japan.............................. 46-81975

[52] U.S. Cl. .................................................. 43/15
[51] Int. Cl. ................................................. A01k 97/12
[58] Field of Search ................ 43/15, 6.5, 16, 19.2

[56] References Cited
UNITED STATES PATENTS

| | | | |
|---|---|---|---|
| 2,523,592 | 9/1950 | Powell et al. | 43/15 |
| 2,536,576 | 1/1951 | Silva | 43/15 |
| 3,138,890 | 6/1964 | Mitchell | 43/6.5 |
| 3,710,499 | 1/1973 | Tadano | 43/15 X |

Primary Examiner—James H. Czerwonky
Attorney, Agent, or Firm—Frank J. Jordan

[57] ABSTRACT

An automatic fishing device which detects a fish on a fishing line through a change in tension of the fishing line is automatically rotatably to operate a fishing rod to fish up or pull in the fish. The device includes a mechanism for varying a fish pulling up force which is automatically increased sequentially with the passage of time commencing when a fish becomes hooked on the line and continuing until the fishing rod reaches a fixed angle. The mechanism comprising an oil pressure changing mechanism wherein different oil pressures are sent in electromagnetic cut valves into a cylinder for pulling up the fishing rod. The control of the valves is effected by an electric circuit which is operable to change in sequence the energization of solenoids which effect the opening and closing of the electromagnetic valves in accordance with the passage of time. According to an alternate embodiment, a mechanism is adapted to provide a sequential changing of the energization of the solenoids which effect the opening and closing of the cut valves in accordance with the rotation of a drum which is rotated by a motor.

16 Claims, 5 Drawing Figures

AUTOMATIC FISHING DEVICE

BACKGROUND OF THE INVENTION

The present invention relates to an automatic fishing device and particularly to an automatic fishing device which detects a fish on a fishing line through a variation in the tension of the line in order to operate or lift a fishing rod to pull in the fish.

With these devices in the prior art, the fish are pulled in with a force, for example, provided by the oil pressure from a pump which pressure is always maintained constant in spite of the size or weight of the fish on the fishing line. Thus, because the oil pressure is held at the magnitude corresponding to the weight of the fish expected to be caught by a fisherman there was no problem when the fish meets the expected weight. However, because the fishing rod is pulled by the same high pressure oil when the fish is smaller or lighter than expected, the fish is abruptly pulled out of the water so as to pull out the fish hook or to cause the fish to jump across the quarter deck and fall back into the water.

It is, therefore, an object of the present invention to provide an automatic fishing device which overcomes the disadvantages of the above mentioned prior devices and which has a mechanism for varying a fish pulling force which is automatically increased sequentially with the passage of time commencing from the instant the fish bits the fish hook and continuing until the fishing rod reaches a fixed angle.

DESCRIPTION OF THE PREFERRED EMBODIMENTS

Figure 1:
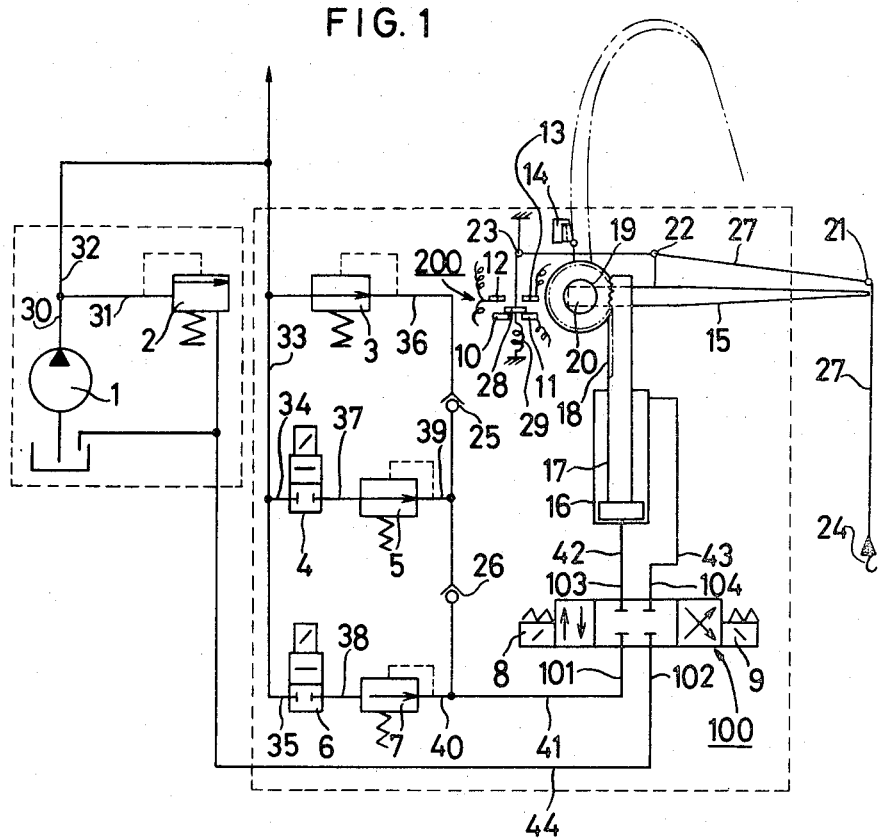
FIG. 1 is a schematic view an oil pressure circuit of a fishing device according to one embodiment of the invention.

Embodiments of a device according to the invention will be explained on the basis of the accompanying drawings as follows. Referring first to FIG. 1 an oil pressure circuit and a fishing device mounted on a fishing equipment body will be described. An oil pump 1 and a relief valve 2 set up a pressure of about 100 Kg/cm². Oil under pressure from the pump 1 is diverted into three oil paths 33, 34 and 35 through paths 30 and 32, the oil pressure in path 33 being reduced by a reducing valve 3 at 40 Kg/cm² and connected to a solenoid 8 through check valves 25 and 26. The oil path 34 is connected to an oil path 41 through an electromagnetic or solenoid operated cut valve 4 which opens when the current flows in the solenoid of the valve 4, an oil path 37, a pressure reducing valve 5, an oil path 39 and a check valve 26. The oil path 35 is also connected to the oil path 41 through an electromagnetic or solenoid operated cut valve 6, which has the same action to the cut valve 4, an oil path 38, a pressure reducing valve 7 and an oil path 40, the oil path 41 being connected to a port 101 of a four-way valve 100. A port 102 of the four way valve 100 is exhausted through an oil path 44 and a port 103 thereof is coupled to a lower chamber of a pressure oil cylinder 16, and further a port 104 is coupled to an upper chamber of the cylinder 16 through an oil path 43. Ports 101, 102, 103 and 104 of the four-way valve 100 are respectively kept in their closed condition when its solenoids 8 and 9 are not excited and the ports 101 and 103, and ports 104 and 102 respectively communicate only when the solenoid 8 is excited. Also, when only the solenoid 9 is excited ports 101 and 104, and ports 103 and 102 respectively communicate. Mounted on an extending portion of a piston spool 17 inserted into and fitted into the cylinder 16 is a rack 18 which always engages with a gear 19 secured to a shaft 20 of a rod pivotally mounted on the body. Also, fixed to the shaft of the rod is a fishing rod 15 which is operated upwardly and downwardly with rotative movement of the gear 19. Reference numeral 24 shows a fish hook, a fishing line 27 of which is fixed to an electric contact 28 of a detecting switch 200 which detects a fish on the line 27 through hooks or loops 21 and 22 secured to the fishing rod 15 and through a hook or loops 23 secured to the body, the electric contact 28 being always biased downwardly by a spring 29. When a fish is not on the fish hook 24 the contact 28 is pushed against lower contacts 10 and 11, the contacts 10 and 11 being in an electrically conductive condition. When a fish is on the hook 24 the contact 28 is pushed to the lower surfaces of contacts 12 and 13 against the bias of spring 29 because the fishing line 27 is drawn downwardly by the weight of the fish and the contacts 12 and 13 are in an electrically conductive condition. A microswitch 14 is adapted to detect that the fishing rod 15 has lifted to a final angle (90°) of the fishing cycle, the microswitch being in an opening condition when the fishing rod is downwardly disposed and being in a closing condition when it lifts to a 90° angle.

Figure 2:
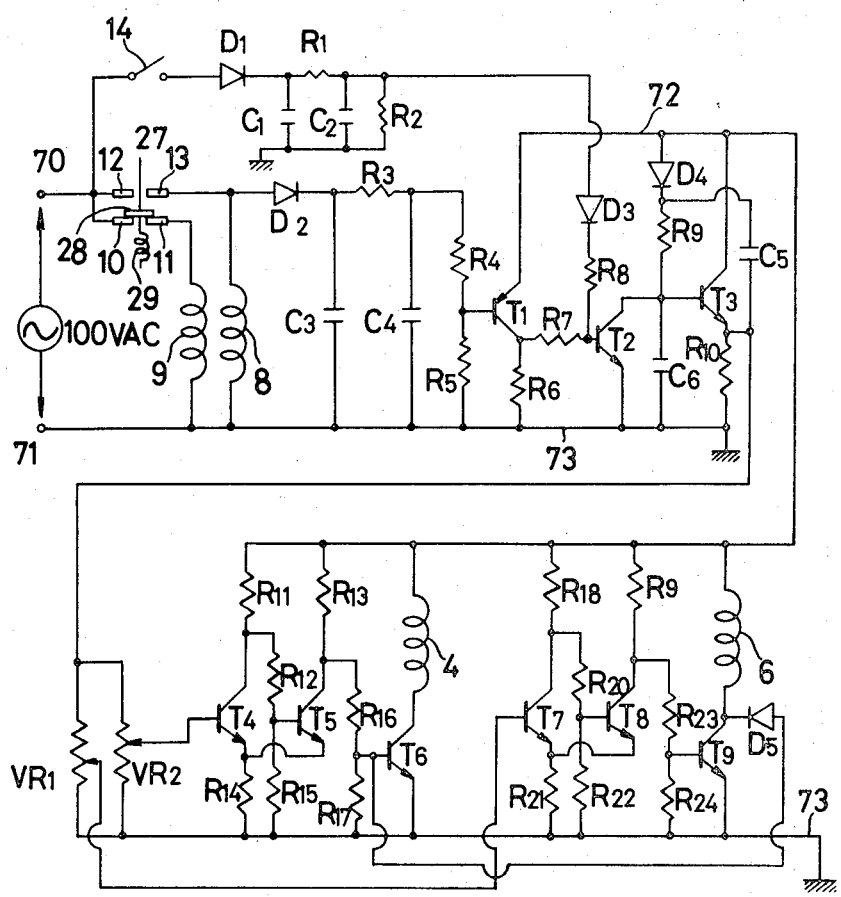
FIG. 2 is a diagram of an electrical control circuit for controlling the oil pressure in the oil pressure circuit shown in FIG. 1.

The control circuit shown generally in FIG. 2 is adapted to generate a signal for operating the valves 4, 6 and 100 of FIG. 1. When a fish is hooked and the contact 28 contacts the contacts 12 and 13, the solenoid 8 is energized as will hereinafter be described in greater detail, in order to connect port 101 with port 103 and port 102 with port 104. Therefore, the pressure of pump 1 effects operation of the piston spool 17 through the pressure control valve 3 so as to raise the spool 17 and pivot the fishing rod 15. As will hereinafter be explained in greater detail, after the lapse of a predetermined time, the solenoid valve 4 is operated to connect the pressure of the pump 1, as now controlled by the pressure reducing valve 5, to the lower portion of the spool 17. As will also hereinafter be explained in greater detail, with another lapse of time, the solenoid valve 6 is energized in order to connect the pump pressure, now controlled by the pressure reducing valve 7, to the lower portion of the spool 17. Accordingly, since the pressure from the pressure reducing valves 5 and 7 are different, the liquid pressure to be used as a raising force for the spool 17 is progressively increased with the lapse of time and also the raising or pivotal force for the fishing rod 15, connected to the spool 17, is progressively increased with the lapse of time. As used herein the term "fishing-up" or "fishing-up force" means the action or the force respectively used for raising or pivoting the fishing rod 15 counterclockwise as viewed in FIG. 1. The fishing-up force corresponds to the liquid pressure for raising the spool 17.

Turning now to a more detailed description, an alternating current power supply is always connected with terminals 70 and 71, and a direct current voltage is applied between lines 72 and 73.

The contact 11 of the detecting switch 200 is connected with one end of the solenoid 9 of the four-way valve 100 and a contact 13 is connected to form a half wave rectifier circuit at one end of the solenoid 8 and a diode D2. The voltage rectified by the above circuit is divided by resistors R4 and R5 after being smoothed by a smoothing circuit consisting of a resistor R3 and condensers C3 and C4 and the divided voltage is applied to the base of a transistor T1. Transistors T1 and T2 form a switching circuit and the emitter of the transistor T1 is connected with the line 72. One end of the collector is grounded through a resistor R6 and the other end thereof is applied to the base of the transistor T2 through a resistor R7. The emitter of the transistor T2 is grounded and the collector thereof is connected with a base of a transistor T3. One end of the microswitch 14 is connected with one end 70 of the alternating current power supply and the other end thereof forms a smoothing circuit consisting of resistors R1, R2 and condensers C1, C2 and through a diode D1, the output of this smoothing circuit being applied to the base of the transistor T2 through diode D3 and a resistor R8. An operable circuit consists of the transistor T3, a diode D4, resistors R9, R10, condensers C5 and C6 and the output of the operable circuit is grounded through two variable resistors VR1 and VR2 connected in parallel. A Schumidt circuit consists of transistors T4, T5, resistors R11, R12, R13, R14 and R15, and the base of the transistor T4 is connected with a movable contact of the variable resistor VR2. The collector of the transistor T5 is grounded through resistors R16 and R17 and is connected with the base of a transistor T6 from a center position between the resistors R16 and R17. The emitter of the transistor T5 is grounded and the solenoid of the cut valve 4 is connected between the collector and the power supply. Another Schumidt circuit consists of transistors T7, T8, resistors R18, R19, R20, R21 and R22, and the collector of the transistor T8 is grounded through resistors R23 and R24 and is connected with the base of a transistor T9 from a center position between the resistors R23 and R24. The emitter of the transistor T9 is grounded and the solenoid of the cut valve 6 is connected between the collector and the power supply. The collector of the transistor T9 is further connected with the base of the transistor T6 through a diode D5.

Figure 3:
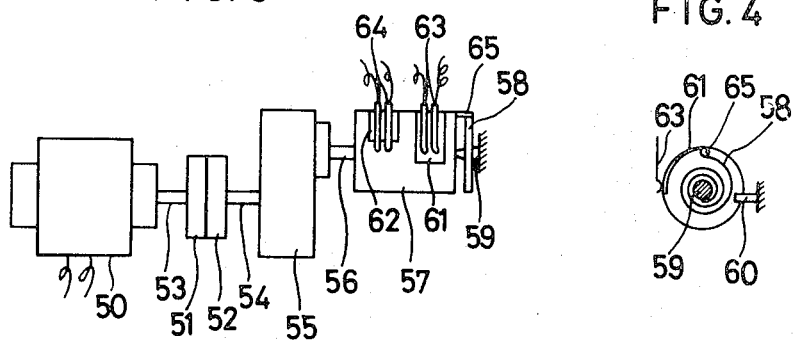
FIG. 3 is a schematic view of an alternate embodiment in which the oil circuit is controlled by a motor.
Figure 4:
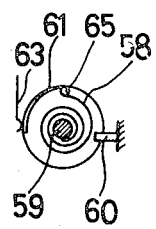
FIG. 4 is a detailed right hand side view of the rotation drum shown in FIG. 3.
Figure 5:
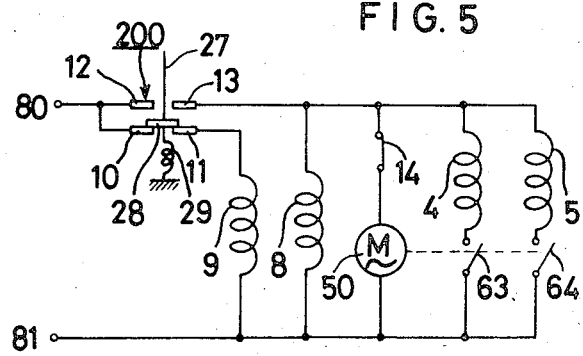
FIG. 5 is an electrical wiring diagram of the electrical circuit used in conjunction with FIG. 3.

Referring now to FIG. 3, 4 and 5 an explanation will now be set forth relating to a second embodiment. In this second embodiment another type of control arrangement controls the oil pressure circuit in the application of a synchronous motor, that is, for varying the fishing up force. In FIGS. 3 and 4, when the power supply is operable a rotative shaft 53 of a motor shown by reference numeral 50 rotates in a clockwise direction as viewed in FIG. 3. A clutch plate 51 fixed to the shaft and a clutch plate 52 fixed to a rotative shaft 54 of a gear box 55 also rotates and when the power supply is cut off, the rotative shaft 53 is returned in the opposite direction to separate the clutch plates 51 and 52. Revolutions of the rotative shaft 54 are reduced through the gear box 55 and are transferred to an output shaft 56 on which a rotating drum 57 is secured to rotate therewith and which is fixed to rotate about a center shaft 59 secured to the body.

On a portion of the rotating drum 57 consisting of insulating materials, copper plates 61 and 62 are fixedly mounted and slidable contacts 63 and 64 are slidably disposed so that each of two pairs of the contacts 64 and 63 become conductive when the contacts 63 and 64 respectively contact the copper plates 61 and 62. Reference numeral 58 indicates a spring, one end of which is secured to the center shaft 59 and the other end of which is secured to an extension 65 mounted on the rotating drum 57, acting always to return and urge the rotating drum 57 in the clockwise direction as viewed in FIG. 4, the spring 58 being so constructed that when the clutch plates 51 and 52 separate from each other, the rotating drum 57 is returned by the spring 58 and is rotated until the extension 65 abuts a stop 60 to put each of two pairs of the contacts 64 and 63 in the non-conductive condition.

Referring to FIG. 5 an explanation will be set forth regarding the electrical wiring drawing in FIG. 5 using the same numerals relating to the same parts as in FIGS. 1 and 2. Applied between terminals 80 and 81 is an alternating current power supply and also, one end of the motor 50 is connected with the other end of the microswitch 14 which is connected with the contact 13 of the detecting switch 200. The slidable contacts 63 and 64 are connected with the cut valves 4 and 5. In this embodiment, the microswitch 14 is in a closed condition when the fishing rod is disposed downwardly and is in an open condition when the rod is in an angular disposition of more than 90°, the action of the microswitch being reverse as compared to the embodiment in FIGS. 1 and 2.

There will now be set forth the action of the first embodiment for varying the fishing up force as illustrated in FIGS. 1 and 2. In FIG. 1, when a fish is not on the hook the fishing line 27 is urged by the spring 29 to maintain a conductive condition of the contacts 10 and 11 to lead the current into the solenoid 9 whereby the oil pressure from the pump 1 enters into the upper chamber in the cylinder 16 through the oil paths 32, 33, the reducing valve 3, the oil path 36, the check valves 25, 26, the oil path 41, the ports 101, 104 and the oil path 43 and pushes the piston spool 17 downwardly.

When a fish is caught on the hook 24 the contact 28 causes a nonconductive condition of the contacts 10 and 11 to thereby cut off the current to the solenoid 9 and causes a conductive condition of the contacts 12 and 13 to lead the current to the solenoid 8 to thereby provide communication between the ports 101 and 103 and between the ports 102 and 104 of the four-way valve 100, respectively. The pump pressure is led into the lower chamber of the cylinder 16 to remove the piston spool 17 upwardly. With the upward movement of the piston spool 17, since the rack 18 rotates the gear 19 which is interconnected with the shaft 20 and the rod 15, the fishing up of the fish is started as the fishing rod 15 rotates counterclockwise as viewed in FIG. 1.

At this time, when the contact 28 energizes the contacts 12 and 13 (FIG. 2) the half-wave rectification of the alternating current power supply from the terminal 70 is effected by the diode D2 and is converted into direct current voltage through the smoothing circuit of the condensers C3, C4 and the resistor R3 whereby the base potential of the transistor T1 is raised. The transistor T1 therefore changes from ON to OFF and the transistor T2 is changed from ON to OFF. The charge to the condenser C6 is started through the diode D4 and the resistor R9, and the emitter potential of the transistor T3 raises in accordance with the passage of elapsed time.

After a passage of the predetermined elapsed time when the emitter potential of the transistor T3 raises to thereby gate the Schumidt circuit consisting of the transistors T4 and T5, the transistors T4, T5 and T6 respectively change from OFF to ON, from ON to OFF and from OFF to ON to thereby lead the current into the solenoid of the cut valve 4.

In this case, when the current leads to the cut valve 4 (FIG. 1) the oil pressure reduced by the reducing valve 5 flows through the oil path 39 and because the reducing valve 5 is predetermined or set at a higher pressure than that of the reducing valve 3, the oil pressure from the reducing valve 3 is cut off by the check valve 25 and the oil pressure from the oil path 39 supplies the higher oil pressure into the lower chamber of the cylinder 16 through the check valve 26 and the oil path 41 to increase the fishing up force of the fishing rod 15.

With a further passage of time, the emitter potential of the transistor T3 raises to gate the Schumidt circuit consisting of the transistors T7 and T8 (FIG. 2) and the transistors T7, T8 and T9 respectively changes from OFF to ON, from ON to OFF and from OFF to ON to lead the current to the solenoid 6. Now, the collector potential of the transistor T9 drops to the ground potential to deteriorate the base potential of the transistor T6 and the transistor T6 changes from ON to OFF to cut off the current to the solenoid of the cut valve 4. The predetermined voltages of the respective Schumidt circuits may be varied from each other by equalizing the input voltages applied to the Schumidt circuits through the variable resistors VR1 and VR2.

In this case, when the cut valve 4 goes to OFF and the cut valve 6 is excited (FIG. 1) the reducing valve 7 becomes operational. As the reducing valve 7 is set at a higher pressure than that of the reducing valves 3 and 5, the oil pressure from the oil paths 36 and 39 is cut off by the check valve 26 and the higher pressure oil is applied to the piston spool 17. However, during changing from the minimum to the medium of the pump pressure and from the medium to the maximum thereof, the rod 15 reaches a fixed angle (which in this embodiment is set at the final angle of the fishing up) the microswitch 14 changes from OFF to ON to lead the alternating voltage to the diode D1 of FIG. 1 to effect the half-wave rectification. The direct current obtained by the smoothing circuit consisting of the resistor R1 and the condensers C1 and C2 is applied to the base of the transistor T2 through the diode D3 and the resistor R8. The transistor T2 changes from OFF to ON to discharge the charge of the condenser C6 to drop the emitter potential of the transistor T3 whereby the excitation of the solenoid 4 or 6 is stopped and the pressure in the cylinder 16 is returned at the minimum pressure.

Next explained is the action of the second embodiment for varying the fishing up force as illustrated in FIGS. 3, 4 and 5. When a fish is not on the hook and the contact 28 is placed on the contacts 10 and 11, the four-way valve 100 is operated by the solenoid 9 in the same manner as in the first embodiment and the pump pressure is sent into the upper chamber of the cylinder 16 to urge the piston spool 17 downwardly.

Now, when a fish is on the hook 24 the contact 28 is pulled up by the fishing line 27 to render the contacts 12 and 13 conductive and the alternating current power supply is applied to the motor 50 through the switch 14 to permit the motor to rotate in accordance with the frequency of the power supply. The rotative shaft 53 moves in the clockwise direction as viewed in FIG. 4 by the starting of the rotation of the motor to drive, the clutch plates 51 and 52 whereby the rotation of the motor is transmitted to the shaft 54. The rotation is reduced by the gears in the gear box 55 to rotate the rotating drum against the bias of spring 58. With the passage of the predetermined time after the starting of the rotation, the contact 63 comes into contact with the copper plate 61 to render it conductive to thereby energize the solenoid of the cut valve 4 whereby the oil pressure responsive to the reducing valve 5 is sent into the cylinder 16.

With the further passage of time, the rotating drum 57 rotates further and then the contact 64 comes into contact with the copper plate 62 to thereby excite the solenoid 5 of the cut valve 5 and the oil pressure responsive to the reducing valve 7 of FIG. 1 is sent into the cylinder 16. The oil pressure for fishing up is changed sequentially to the high pressure as in the first embodiment in accordance with the length of the passage of time until the rod 15 reaches a fixed angle (which in this embodiment is set at the final angle of the fishing up).

After the starting of the rotation of the motor 50, when the fishing rod raises more than the fixed angle the microswitch 14 in FIG. 1 acts to change from ON to OFF to cut off the power supply to the motor 50 and then the shaft 53 of the motor moves in an opposite direction to separate the clutch plates 51 and 52 whereby the transmission of the rotation of the motor to the shaft 54 is stopped. Because the rotating drum 57 is returned to the initial position by the spring 58 the contacts 64 and 63, are disposed in an OFF condition to thereby cut off the current to the solenoid of the cut valves 4 and 5, and the oil pressure responsive to the reducing valve 3 is sent into the cylinder 16. Thus, when the fish separates from the hook 24 the contact 28 is drawn by the spring 29 to render the contacts 10 and 11 conductive and the oil pressure from the pump 1 passes into the course of the oil paths 32, 33, the reducing valve 3 and the oil path 36 whereby the solenoid 9 is actuated to move the piston spool 17 downwardly and then the rod 15 is taken down to wait for the next fish on the hook.

According to the invention because the automatic fishing device which detects the fish on the fishing line through the tension of the line automatically rotates to operate the fishing rod to fish up the fish includes an arrangement for varying the fishing up force and which is automatically increased in sequence with the passage of time until the fishing rod reaches a fixed angle from the time of the presence of the fish on the line, the fishing up can be effected by the fishing up force responsive to the weight of the fish. Therefore, according to the invention there is overcome the disadvantage of the prior known devices wherein upon the fishing up, because the fishing up force, for example the oil pressure form the pump, is always maintained constant in spite of the size of the fish on the fishing line, that is, because the oil pressure is held at the magnitude required or corresponding to the weight of the fish thought or expected to be caught by the fisherman, there is no problem when the fish meets this expected weight, but because the fishing rod is pulled by the high pressure oil when the fish is smaller or lighter than that expected, the fish is abruptly pulled out of the water so as to pull out the fish hook or to cause the fish to jump across the quarter deck and fall back into the water.

What is claimed is:

1. An automatic fishing device having a fishing rod and a fishing line, comprising a source of liquid pressure, a hydraulically actuated means operatively connected to said fishing rod for actuating the latter, a first passage means for connecting said source of liquid pressure and said actuating means, a first pressure control means installed in said first passage means in order to regulate and keep the liquid pressure from said source at a predetermined value, a switch means for detecting the hooking of a fish on said fishing line by the change in tension of said fishing line, a first change-over valve means installed in said first passage means and operated by said switch means, at least one second passage means for connecting the liquid pressure source and said actuated means, a control means operatively connected to said switch means in order to generate at least one output signal at the moment a predetermined length of time is elapsed said length of time being determined from the instant that a fish is hooked on said fishing line, at least one second control valve means installed in said second passage means and operated in response to said output signal of said control means, a second pressure control means installed in said second passage means and adapted to be regulated in pressure by said control means in order to control the liquid pressure in said second passage means and maintain the liquid pressure in said second passage means at a value higher than said predetermined value.

2. An automatic fishing device according to claim 1, wherein said actuated means comprises a slidable spool means, operating means operatively connecting said spool means to said fishing rod, a first means on said actuated means for receiving the liquid pressure from said first and second passage means in order to slide said spool means along a first direction, and a second means on said actuated means for receiving the liquid pressure from said first and second passage means in order to slide said spool means along another direction.

3. An automatic fishing device according to claim 2, wherein said operating means comprises a gear means operable to be rotated in response to said sliding movement of said spool means, and a rotary shaft connected to said gear means and operable to raise and lower said fishing rod.

4. An automatic fishing device according to claim 2, wherein said first control valve comprises at least a first position for connecting said first passage means to said first means of said actuated means and for draining the liquid contained in said second means of said actuated means, and a second position for connecting said second passage means to said second means of said actuated means and for draining the liquid contained in said first means of said actuated means.

5. An automatic fishing device according to claim 4, wherein said second passage means is connected to said actuated means through said first change-over valve.

6. An automatic fishing device according to claim 1, wherein said second passage means comprises two passages connecting said liquid pressure source to said actuated means, said second control valve means comprises two change-over valves installed in said two passages respectively of said second passage means, said second pressure control means comprises two valves installed respectively in said two passages of said second passage means in order to regulate the pressure of said two passages and determine them as a first and a second predetermined pressures, one of said change-over valves being adapted to operate in response to said first output signal, said other change-over valve being adapted to operate a second predetermined period of time starting from the time a fish is hooked on said fishing line.

7. An automatic fishing device according to claim 6, wherein said two passages of said second passage means are connected to the actuated means through said first change-over valve means.

8. An automatic fishing device according to claim 1, wherein said control means comprises a first circuit connected to said switch means in order to charge a predetermined value correspondingly with the lapse of time after said switch means operates upon detecting that a fish is hooked, and a second circuit for comparing the output voltage of said first circuit to a predetermined voltage in order to generate said output signal.

9. An automatic fishing device according to claim 8, comprising further a switching circuit responding to operation of said switch means to energize said first circuit.

10. An automatic fishing device according to claim 9, comprising further means for detecting when the fishing rod has reached a predetermined angle in order to deenergize said switching circuit.

11. An automatic fishing device according to claim 8, wherein said second circuit comprises a Schumidt circuit.

12. An automatic fishing device according to claim 8, wherein said second passage means comprises two passages for connecting the source of liquid pressure to the actuated means individually, said second control valve means comprises two change-over valves respectively installed in said two passages of said second passage means, said second pressure control means comprises two valves installed respectively in said two passages of said second passage means in order to regulate and keep the respective liquid pressures in said two passages at predetermined first and second values, and said second circuit of said control means comprises two Schumidt circuits for comparing an output voltage of said first circuit with predetermined voltages respectively and generating two output signals for operating said two change-over valves.

13. An automatic fishing device according to claim 12, including first and second variable resistors, said first circuit being connected to said two Schumidt circuits respectively through said first and second variable resistors.

14. An automatic fishing device according to claim 1, wherein said control means comprises an electric motor operatively connected to said switch means, a gear box, a clutch means operatively connecting said motor to said gear box, a rotary drum operatively connected to said gear box, and a second switch means for generating said output signal in response to the operation of said rotary drum.

15. An automatic fishing device according to claim 14, comprising further means for deenergizing said motor when the fishing rod raises and reaches a predetermined angle.

16. An automatic fishing device according to claim 14, wherein said second passage means comprises two passages for connecting said liquid pressure source to said actuated means, said second control valve means comprises two change-over valves installed in said two passages of said second passage means, said second pressure control means comprises two valves installed respectively in said two passages of said second passage means in order to regulate and keep the individual liquid pressure in said two passages at a first and second predetermined pressures respectively, and said second switch means of said control means comprises two switches for operating said two change-over valves in response to the revolution of said rotary drum.

* * * * *

UNITED STATES PATENT OFFICE
CERTIFICATE OF CORRECTION

Patent No. 3,813,806                     Dated June 4, 1974

Inventor(s) Koji NISHIDA et al

It is certified that error appears in the above-identified patent and that said Letters Patent are hereby corrected as shown below:

Change the first inventor's name from "Koji NISHI" to --Koji NISHIDA--.

Change the first assignee's name from "Aishin Seiki Co., Ltd." to --Aisin Seiki Co., Ltd.--.

Signed and sealed this 15th day of October 1974.

(SEAL)
Attest:

McCOY M. GIBSON JR.            C. MARSHALL DANN
Attesting Officer              Commissioner of Patents